(12) United States Patent
Itsuji

(10) Patent No.: US 8,153,999 B2
(45) Date of Patent: Apr. 10, 2012

(54) TERAHERTZ WAVE GENERATING DEVICE AND APPARATUS USING THE SAME

(75) Inventor: Takeaki Itsuji, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 197 days.

(21) Appl. No.: 12/509,882

(22) Filed: Jul. 27, 2009

(65) Prior Publication Data

US 2010/0044597 A1    Feb. 25, 2010

(30) Foreign Application Priority Data

Aug. 25, 2008  (JP) ................................. 2008-215549

(51) Int. Cl.
*G01J 5/02* (2006.01)
(52) U.S. Cl. ................................. 250/504 R; 250/251
(58) Field of Classification Search .............. 250/504 R, 250/338.4
See application file for complete search history.

(56) References Cited

U.S. PATENT DOCUMENTS

| | | | |
|---|---|---|---|
| 5,028,971 A | 7/1991 | Kim et al. | ........... 35/30 |
| 5,894,125 A * | 4/1999 | Brener et al. | .................. 250/330 |
| 6,320,191 B1 * | 11/2001 | Rudd | ........................ 250/341.1 |
| 7,630,588 B2 * | 12/2009 | Ouchi | ................................ 385/8 |
| 7,633,043 B2 * | 12/2009 | Ouchi | ........................ 250/214.1 |
| 7,741,933 B2 * | 6/2010 | Duwel et al. | .................... 333/187 |
| 2005/0121629 A1 * | 6/2005 | Unterrainer et al. | ....... 250/504 R |
| 2007/0279136 A1 * | 12/2007 | Koyama et al. | ............. 331/107 T |
| 2007/0279143 A1 * | 12/2007 | Itsuji | .............................. 331/185 |
| 2007/0280319 A1 * | 12/2007 | Sekiguchi et al. | ......... 372/45.01 |
| 2008/0186239 A1 | 8/2008 | Itsuji | |
| 2008/0217538 A1 * | 9/2008 | Ouchi et al. | ................ 250/338.4 |
| 2008/0224874 A1 * | 9/2008 | Rodgers | ...................... 340/572.7 |
| 2009/0009190 A1 * | 1/2009 | Itsuji | .............................. 324/639 |
| 2009/0009853 A1 * | 1/2009 | Tonucci | ......................... 359/298 |
| 2009/0051452 A1 * | 2/2009 | Asada et al. | ................ 331/107 T |

FOREIGN PATENT DOCUMENTS

EP    0 606 776 A2    7/1994

OTHER PUBLICATIONS

L. Xu et al., "Terahertz radiation from large aperture Si *p-i-n.* diodes" Applied Physics Letter, vol. 59, No. 26, Dec. 23, 1991, pp. 3357-3359.
Oct. 15, 2009 European Search Report in European Patent Appln. No. 09167169.3.
Mar. 15, 2010 Reply in European Patent Appln. No. 09167169.3.

* cited by examiner

*Primary Examiner* — Jack Berman
*Assistant Examiner* — Jason McCormack
(74) *Attorney, Agent, or Firm* — Fitzpatrick, Cella, Harper & Scinto

(57) ABSTRACT

Provided is a terahertz wave optical device that can be used as a terahertz wave generating device including: an optical switch portion for generating a carrier abruptly by irradiation with excitation light; and a first electrode portion and a second electrode portion that are disposed so as to be opposed to each other with the optical switch portion therebetween so as to apply an electric field in a thickness direction of the optical switch portion. The first electrode portion includes, at least in part, an antenna portion having an antenna function of distributing the carrier generated by the irradiation with the excitation light in a direction crossing an application direction of the electric field. With the terahertz wave optical device, a step for adjusting the incident angle of the excitation light is simplified.

10 Claims, 6 Drawing Sheets

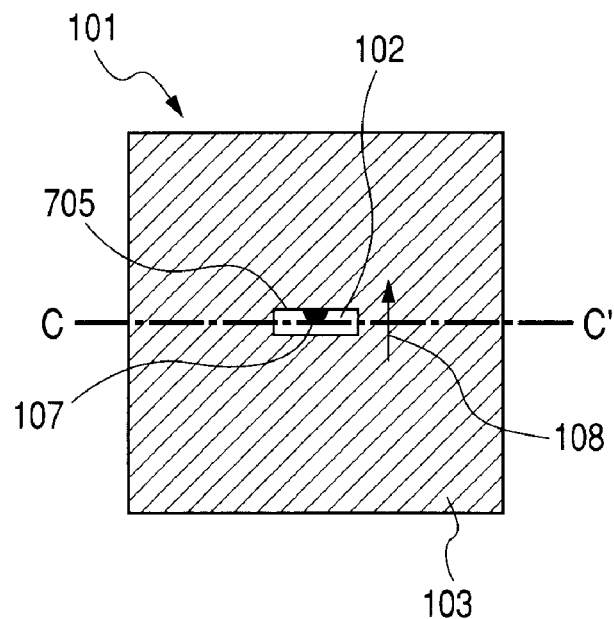
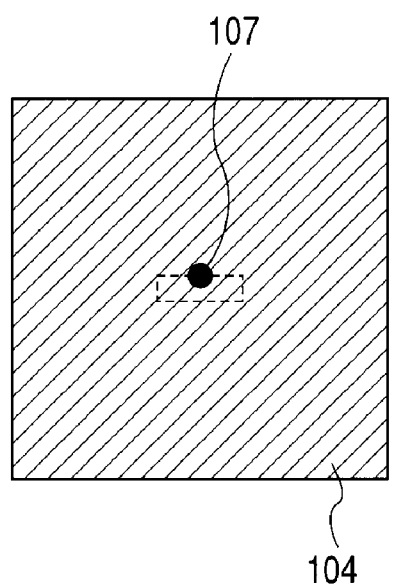
FIG. 2A  FIG. 2B
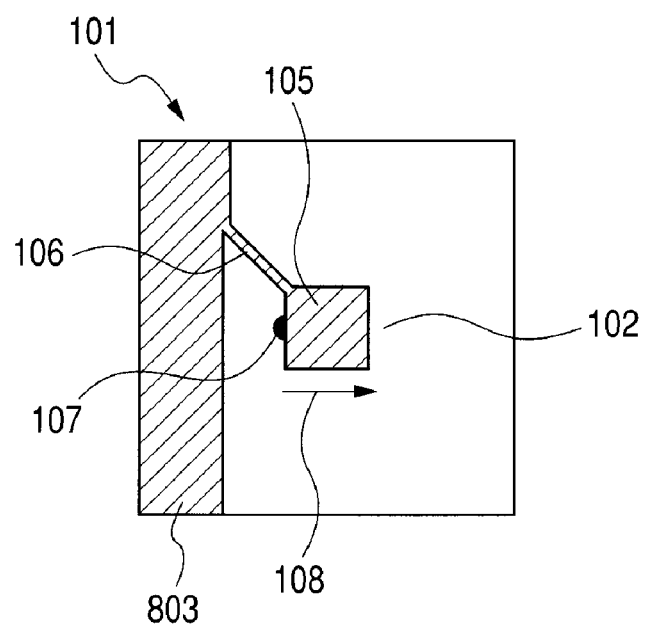
FIG. 2C

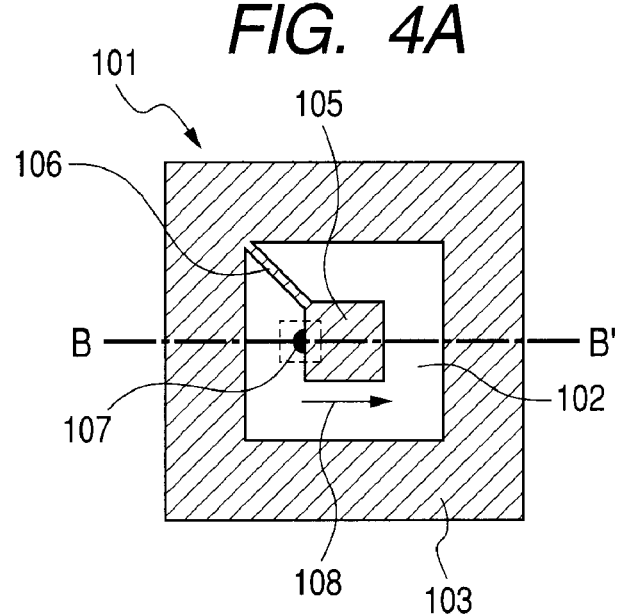
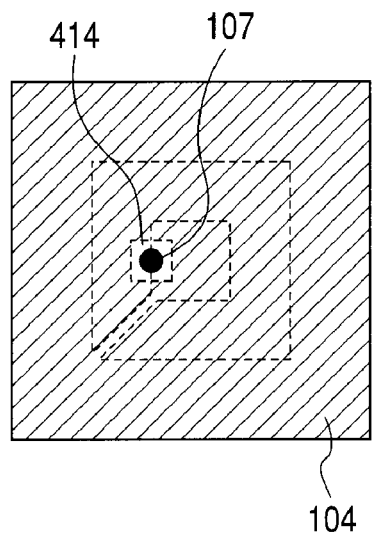
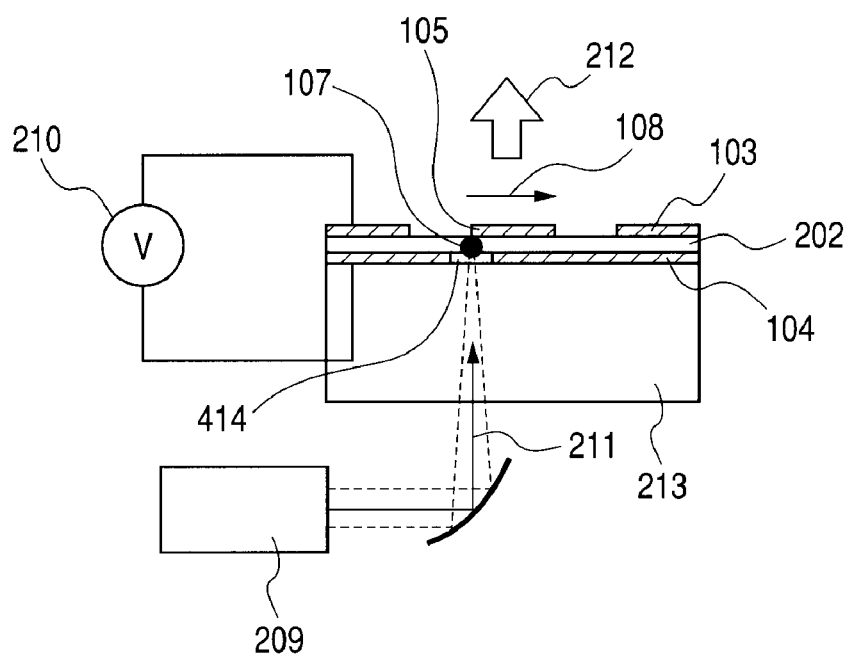

TERAHERTZ WAVE GENERATING DEVICE AND APPARATUS USING THE SAME

BACKGROUND OF THE INVENTION

1. Field of the Invention

The present invention relates to a terahertz wave optical device such as a terahertz wave generating device for generating a terahertz wave by irradiation with excitation light. In addition, the present invention relates to an apparatus such as a terahertz wave generating apparatus that uses the terahertz wave generating device.

2. Description of the Related Art

The terahertz wave is an electromagnetic wave having an arbitrary frequency band in the range from 0.03 THz to 30 THz. In the terahertz wave band, there are many distinctive absorption regions depending on structures and states of various substances such as a biomolecule. There is developed an inspection technology of performing analysis or identification of a substance while the substance is not destroyed utilizing the characteristic described above. In addition, the terahertz wave is expected to be applied to a safe imaging technology without using x-rays and a high speed communication technology.

In order to implement those technologies, it is one of important elements to advance development of a technology of generating a terahertz wave. In recent years, as the technology of generating a terahertz wave, a terahertz wave generating device utilizing a PIN photodiode is disclosed in Appl. Phys. Lett. 59, 3357 (1991). This terahertz wave generating device has a structure in which electrodes are disposed so as to sandwich a PIN photodiode layer serving as a carrier generating portion, whereby an electric field is applied in a thickness direction of the PIN photodiode layer. Then, a pulse beam is irradiated in a slanting direction with respect to the application direction of the electric field, and hence a terahertz wave is generated. The intensity of the terahertz wave depends on the intensity of the electric field that is applied to the generated carrier. With this device structure, the film thickness of the carrier generating portion is adjusted so as to adjust a distance between the electrodes. As a result, a stronger electric field can be easily applied to the carrier, and hence a high intensity terahertz wave generating device may be provided The terahertz wave is generated by a dipole radiation accompanying migration of the carrier generated abruptly by irradiation with the excitation light. On this occasion, there is no component of the electric field or the magnetic field of the terahertz wave on an extension line in the dipole direction, and hence it is difficult to radiate the terahertz wave in the application direction of the electric field. Therefore, in the conventional terahertz wave generating device such as the device disclosed in Appl. Phys. Lett. 59, 3357 (1991), in which the electric field is applied in the thickness direction of the carrier generating portion, a method has been widely adopted, in which the excitation light is irradiated in a slanting direction to the terahertz wave generating device. In addition, it is known that an incident angle of the excitation light also depends on the device structure and that there is an angle at which maximum radiation efficiency can be obtained. From those facts, the step for adjusting the incident angle of the excitation light irradiating the terahertz wave generating device becomes necessary, and hence an optical adjustment may become complicated. Depending on an apparatus form to be provided, it may be required to improve such complicated adjustment.

SUMMARY OF THE INVENTION

In view of the above-mentioned problem, a terahertz wave optical device according to an aspect of the present invention includes: an optical switch portion for generating a carrier abruptly (being transiently conductive in a typical case) by excitation light; and a first electrode portion and a second electrode portion that are disposed so as to be opposed to each other with the optical switch portion disposed therebetween so as to apply an electric field in a thickness direction of the optical switch portion. The first electrode portion includes an antenna portion having an antenna function at least in part, and the antenna portion distributes the carrier generated by the excitation light in a direction crossing an application direction of the electric field. With this structure, the excitation light irradiates an irradiation region that is positioned with respect to the antenna portion so that the carrier can couple to the antenna portion from the second electrode portion side, while a terahertz wave is emitted from the first electrode portion side.

In addition, in view of the above-mentioned problem according to an aspect of the present invention, a terahertz wave generating apparatus for emitting a terahertz wave by irradiation with excitation light includes: the terahertz wave optical device; a bias applying portion for applying an electric field in the thickness direction of the optical switch portion via the first electrode portion and the second electrode portion; and an excitation light generating portion for generating the excitation light for irradiating the irradiation region. With this structure, the excitation light irradiates the irradiation region that is positioned with respect to the antenna portion so that the carrier can couple to the antenna portion from the second electrode portion side, while the terahertz wave is emitted from the first electrode portion side.

Furthermore, in view of the above-mentioned problem, according to another aspect of the present invention, the terahertz wave optical device that can be used as a terahertz wave generating device includes: an optical switch portion for generating a carrier abruptly by irradiation with excitation light; and a first electrode portion and a second electrode portion that are disposed so as to be opposed to each other with the optical switch portion therebetween so as to apply an electric field in a thickness direction of the optical switch portion. Furthermore, the first electrode portion includes, at least in part, an antenna portion having an antenna function of distributing the carrier generated by the irradiation with the excitation light in a direction crossing an application direction of the electric field.

Furthermore, a terahertz wave generating device according to still another aspect of the present invention includes: a carrier generating portion for generating a carrier by excitation light that is irradiated; a first electrode that is provided to the carrier generating portion and includes an antenna portion; and a second electrode disposed so as to be opposed to the first electrode via the carrier generating portion, in which the antenna portion generates a terahertz wave having an electric field component in an in-plane direction of the carrier generating portion.

Furthermore, a terahertz wave generating apparatus according to another aspect of the present invention includes: the above-mentioned terahertz wave generating device; an excitation light generating portion for irradiating the excitation light to the second electrode side of the terahertz wave generating device so as to couple the carrier to the antenna portion; and a voltage applying portion for applying a voltage to the first electrode and the second electrode so that the voltage is applied in a direction substantially perpendicular to the in-plane direction of the carrier generating portion, in which the terahertz wave is generated from the first electrode side of the terahertz wave generating device.

According to the terahertz wave optical device of the present invention, the antenna portion adjusts distribution of the carrier caused by optical pumping in the direction crossing the application direction of the electric field. Thus, for example, a dipole direction accompanying migration of the carrier may be inclined (a dipole direction may cross the thickness direction of the optical switch portion), and hence the terahertz wave can be generated and emitted in the application direction of the electric field. As a result, for example, the excitation light does not need to enter in a slanting direction in the terahertz wave generating device. Thus, it is possible to obtain an effect of simplifying or eliminating the step of adjusting the incident angle of the excitation light.

Further features of the present invention will become apparent from the following description of exemplary embodiments with reference to the attached drawings.

BRIEF DESCRIPTION OF THE DRAWINGS

FIGS. 2A and 2B are diagrams illustrating another form of an antenna portion formed in a first electrode portion as to the terahertz wave generating device according to Embodiment 1.

FIG. 2C is a diagram illustrating another form of the first electrode portion as to the terahertz wave generating device according to Embodiment 1.

FIGS. 4A and 4B are diagrams illustrating a structure of a terahertz wave generating device or optical device according to Embodiment 3 of the present invention.

FIG. 4C is a diagram illustrating a structure of the terahertz wave generating device and a terahertz wave generating apparatus according to Embodiment 3.

DESCRIPTION OF THE EMBODIMENTS

Figure 1A:
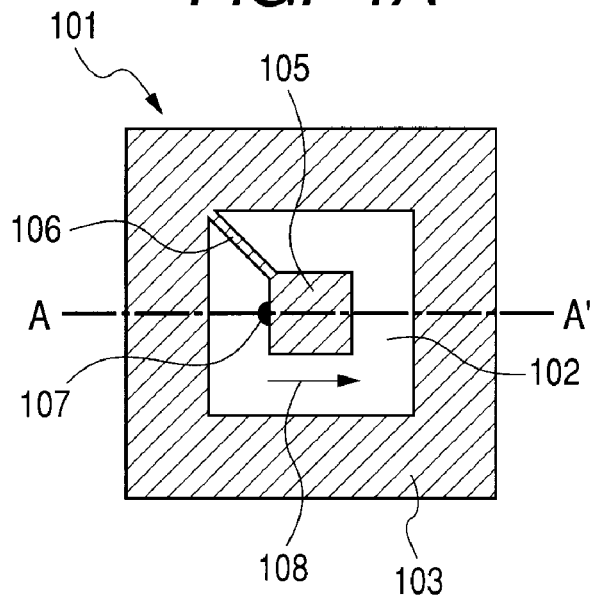
FIGS. 1A and 1B are diagrams illustrating a structure of a terahertz wave generating device or optical device according to Embodiment 1 and Example 1 of the present invention.

Hereinafter, embodiments of the present invention are described. Important things for a terahertz wave optical device such as a generating device of the present invention are to apply an electric field in the thickness direction of an optical switch portion, and that an antenna portion having an antenna function has a structure for distributing a carrier generated by excitation light in the direction crossing an application direction of the electric field. Based on this concept, the terahertz wave optical device according to a basic embodiment of the present invention includes an optical switch portion for generating the carrier abruptly by the excitation light, and a first electrode portion and a second electrode portion that are disposed so as to be opposed to each other with the optical switch portion disposed therebetween so that the electric field is applied in the thickness direction of the optical switch portion. Furthermore, the first electrode portion includes an antenna portion having an antenna function at least in part. The antenna portion has a structure for distributing the carrier generated by the excitation light in the direction crossing the application direction of the electric field. Thereby, the excitation light is irradiated to an irradiation region that is positioned with respect to the antenna portion so that the carrier can couple to the antenna portion from the second electrode portion side, while a dipole is generated in the direction crossing the thickness direction of the optical switch portion, and hence a terahertz wave is emitted from the first electrode portion side.

In addition, based on a similar concept, the terahertz wave optical device according to a basic embodiment of the present invention that is used as a generating device or the like includes an optical switch portion for generating the carrier abruptly by irradiation with excitation light, and a first electrode portion and a second electrode portion that are disposed so as to be opposed to each other via the optical switch portion disposed therebetween. Furthermore, the first electrode portion includes an antenna portion having an antenna function at least in part, for distributing the carrier generated by the irradiation with the excitation light in the direction crossing the application direction of the electric field.

On the precondition of the basic structure described above, a structure, an arrangement, and the like of the individual portions can have various forms. For instance, as in Embodiment 1 that is described later, the antenna portion may include an edge extending in the direction crossing the thickness direction of the optical switch portion, and the irradiation region with the excitation light may be positioned to a vicinity of the edge. In addition, as in Embodiment 3 that is described later, the second electrode portion may include a lighting part in part for taking excitation light, and the lighting part may be positioned so as to overlap the irradiation region with the excitation light when viewed from the thickness direction of the optical switch portion. In addition, as in Embodiment 1 that is described later, the first electrode portion may include a fine line portion for applying the electric field to the antenna portion, and the fine line portion may be disposed so that the longitudinal direction thereof crosses the direction of the electric field component of the terahertz wave. Furthermore, as in Embodiment 4 that is described later, multiple sets of elements constituting the optical device may be integrated, and the excitation light may be irradiated from the second electrode portion side to the irradiation region of the multiple sets of elements collectively.

Next, more concrete embodiments that can implement the concept of the present invention are described with reference to the attached drawings.

Embodiment 1

Embodiment 1 relates to a terahertz wave optical device according to the present invention. In addition, Embodiment 1 also relates to a terahertz wave generating apparatus that can drive the device.

Figure 1B:
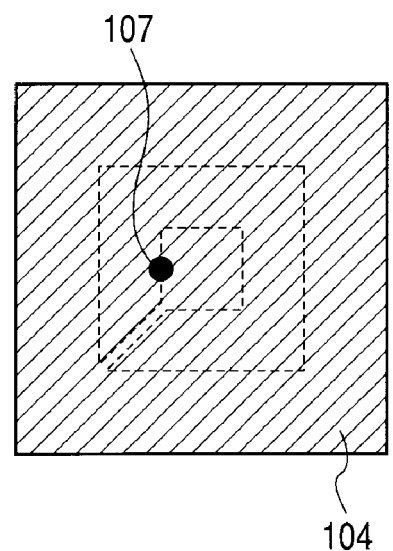

FIGS. 1A and 1B are diagrams illustrating a schematic structure of the device according to this embodiment. Here, FIG. 1A is a top view of the terahertz wave optical device while FIG. 1B is a bottom view of the same. As illustrated in FIGS. 1A and 1B, a terahertz wave generating device 101 includes an optical switch portion 102, a first electrode portion 103, and a second electrode portion 104. An antenna portion 105 and a fine line portion 106 are formed in a part of the first electrode portion 103. The antenna portion 105, the fine line portion 106, and the like define characteristics of conversion of electromagnetic wave energy performed between a space and the device. Typically, as described later, the antenna portion 105 and the fine line portion 106 function as an impedance converter (antenna) for extracting a terahertz wave externally.

The optical switch portion 102 is a portion for generating a carrier by excitation light that enters externally. When a pulse beam is used as the excitation light, the optical switch portion 102 becomes conductive transiently by the excitation light. Here, what is important is not a short life of the optically pumped carrier but the abrupt generation of the carrier. As the excitation light, it is possible to use continuous light having a difference frequency between light beams from two light sources (the continuous light itself is modulated by a frequency in the terahertz region). The behavior of the carrier changes radiation characteristics of the terahertz wave.

As a structure of the optical switch portion 102, it is possible to apply a semiconductor material or a semiconductor device having absorption characteristics for the excitation light. As such a semiconductor material, there are included gallium arsenide (GaAs), indium gallium arsenide (InGaAs), and the like. Herein, the semiconductor material that is used as the optical switch portion 102 may be sometimes referred to as a photoconductive film. In addition, as the semiconductor device, it is possible to apply a device such as a photodiode having a rectification action caused by the excitation light. The semiconductor material and the device structure of the semiconductor device are selected appropriately according to a wavelength of the excitation light and a desired behavior of the generated carrier (determined by carrier mobility or the like of the semiconductor material or the like).

The first electrode portion 103 and the second electrode portion 104 are disposed so as to be opposed to each other with the optical switch portion 102 disposed therebetween. Those electrode portions are used for applying the electric field in the thickness direction of the optical switch portion 102. This electric field determines a direction and a speed of migration of carrier generated in the optical switch portion 102. The first electrode portion 103 and the second electrode portion 104 are each made of a conductive material. For instance, as the material of those electrode portions, a metal material such as gold (Au) can be used. In addition, it is possible to apply a structure of combination of a semiconductor material having conductivity adjusted by doping impurity and a metal material. As such a semiconductor material, for example, there is included indium phosphide (InP) in which tin (Sn) is doped.

The antenna portion 105 is formed in a part of the first electrode portion 103 in this embodiment. As illustrated in FIGS. 1A and 1B, the antenna portion 105 has a shape that is substantially isolated from the first electrode portion 103.

As another form of the antenna portion, as illustrated in FIGS. 2A and 2B, it is possible to adopt a form in which the electrode material of the portion corresponding to an antenna portion 705 is eliminated. The antenna portion 105 illustrated in FIGS. 1A and 1B works as a patch antenna, while the antenna portion 705 illustrated in FIGS. 2A and 2B works as a slot antenna. The antenna portion 705 as illustrated in FIGS. 2A and 2B works as an antenna including the first electrode portion 103 when current caused by the optically pumped carrier is distributed along the edge of the antenna portion 705. In other words, the entirety of the first electrode portion 103 can be regarded as the antenna portion 705. In this case, the current oscillates along the edge of the antenna portion 705 with an irradiation region 107 with the excitation light or its vicinity as the starting point. Therefore, in the horizontal direction of FIGS. 2A and 2B, oscillation currents in the opposite directions cancel each other. Only a dipole caused by oscillation currents in the same direction in the vertical direction of FIGS. 2A and 2B remains, and the dipole extending substantially in the vertical direction of FIGS. 2A and 2B is generated. Thus, the terahertz wave in an electric field component direction illustrated in FIGS. 2A and 2B by reference numeral 108 is emitted in the direction substantially perpendicular to drawing plane.

The form as illustrated in FIGS. 2A and 2B can be applied to the form of the antenna portion illustrated in FIGS. 1A and 1B as well. Specifically, a patch portion of the patch antenna (corresponding to antenna portion 105) is left but other portions (corresponding to fine line portion and frame shaped portion) are eliminated, whereby the bias is applied to the patch portion directly by a probe or the like externally. With this structure, the entirety of the first electrode portion 103 can be regarded as the antenna portion 105.

In addition, though the antenna portion 105 is surrounded by the first electrode portion 103 in FIGS. 1A and 1B, it is possible to adopt the shape in which a first electrode portion 803 does not surround the antenna portion 105 as illustrated in FIG. 2C. In other words, the first electrode portion including the antenna portion and the second electrode portion can have any forms as long as the electric field can be applied in the thickness direction of the optical switch portion 102, and the carrier caused by the optical pumping can be distributed in the direction crossing the application direction of the electric field.

In this embodiment illustrated in FIGS. 1A and 1B, the excitation light is irradiated to the region overlapping the antenna portion 105 in part. Herein, the region may be referred to as the irradiation region 107 with the excitation light. The antenna portion 105 has conductivity similarly to the first electrode portion 103, and hence the carrier generated in the optical switch portion 102 is distributed along the antenna portion 105. In other words, the carrier is distributed in the direction crossing the direction of the electric field that is applied by the first electrode portion 103 and the second electrode portion 104. When the antenna portion 105 is set to be sufficiently larger than the thickness of the optical switch portion 102, the direction along the antenna portion 105 becomes dominant in the distribution direction of the carrier.

In the embodiment illustrated in FIGS. 1A and 1B, similarly to the description of the form illustrated in FIGS. 2A and 2B, current caused by the optically pumped carrier oscillates along the edge of the antenna portion 105 with the irradiation region 107 with the excitation light or its vicinity as the starting point. Therefore, in the vertical direction of FIGS. 1A and 1B, oscillation currents in the opposite directions cancel each other. Only a dipole caused by oscillation current in the same direction in the horizontal direction of FIGS. 1A and 1B remains, and the dipole extending substantially in the horizontal direction of FIGS. 1A and 1B is generated. Thus, the terahertz wave in the electric field component direction illustrated in FIGS. 1A and 1B by reference numeral 108 is emitted in the direction substantially perpendicular to drawing plane.

In this embodiment, the antenna portion 105 has the edge extending in the direction crossing the thickness direction of the optical switch portion 102, and the irradiation region 107 with the excitation light is disposed in the vicinity of the edge. However, the form is not limited thereto. It is sufficient if the irradiation region is close to the antenna portion so that the carrier caused by the optical pumping can couple to the antenna portion. Therefore, as long as such action is secured, the irradiation region may be slightly apart from the antenna portion or may overlap the antenna portion substantially.

As described above, the antenna portion 105 works as an impedance converter (antenna) for extracting the terahertz wave externally, and hence the antenna portion 105 has a size that substantially corresponds to the wavelength of the generated terahertz wave. The same is true for other embodiments.

In this embodiment, the fine line portion 106 is a portion for electrically connecting the first electrode portion 103 to the antenna portion 105 formed in a part of the first electrode portion 103. The electromagnetic wave generated from the terahertz wave generating device may be generated not only from the antenna portion 105 but also from the electrode connected to the antenna portion 105. An electromagnetic wave may be generated along the fine line portion 106 depending on the structure of the terahertz wave generating device, and hence it is desirable that the length of the fine line portion 106 be sufficiently larger than the size of the antenna portion 105. For instance, it is desirable that the length of the fine line portion 106 be several ten times or more with respect to the wavelength for the antenna portion 105 to work as an antenna. As a result, the wavelength of the electromagnetic wave generated from the fine line portion 106 can be larger than the wavelength of the terahertz wave generated from the antenna portion 105 by a digit order. Therefore, electromagnetic waves are easily separated according to the wavelength.

In addition, when the fine line portion 106 is inclined with respect to the electric field component direction 108 of the terahertz wave, polarization directions of the electric field components can be inclined from each other. As a result, electromagnetic waves are easily separated by polarization, whereby unwanted electromagnetic wave components can be removed easily. Such separation of electromagnetic waves by polarization control has a largest effect when the longitudinal direction of the fine line portion 106 is perpendicular to the electric field component direction 108 of the terahertz wave. In the terahertz wave generating device thus structured, the unwanted electromagnetic wave components generated from the fine line portion 106 used for applying the electric field propagate in a slanting manner with respect to the electromagnetic wave component of the terahertz wave. Therefore, the unwanted electromagnetic wave components are easily removed. However, in the structure illustrated in FIGS. 1A and 1B, the longitudinal direction of the fine line portion 106 is not perpendicular to the electric field component direction 108 of the terahertz wave but is inclined by an angle of 45 degrees. This form is based on a design intention of adapting the fine line portion 106 to be as long as possible in the same device size.

Figure 1C:
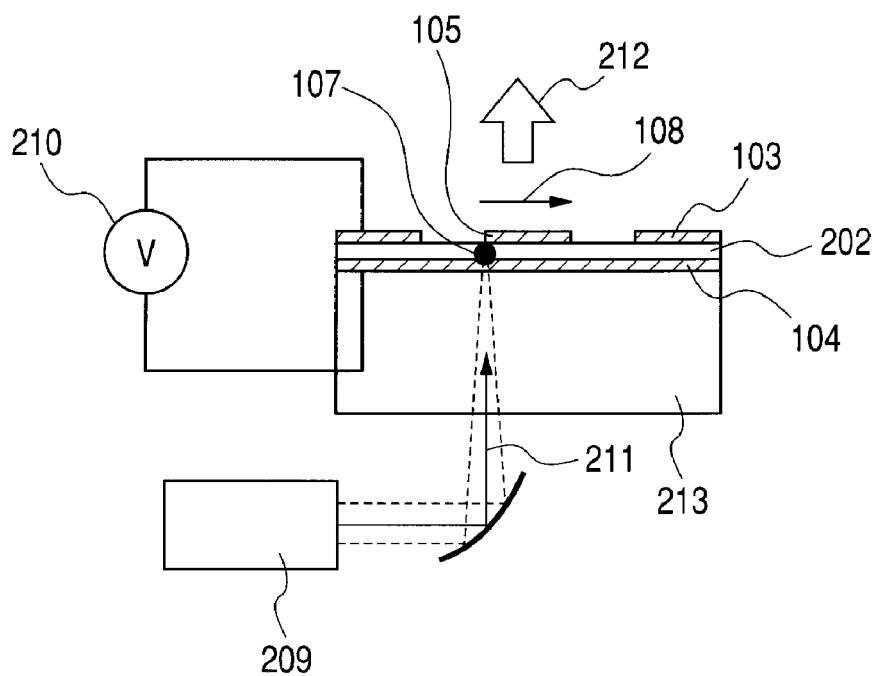
FIG. 1C is a diagram illustrating a structure of the terahertz wave generating device and a terahertz wave generating apparatus according to Embodiment 1 and Example 1.

FIG. 1C is a cross section of the terahertz wave generating device taken along the alternate long and short dash line AA' of FIG. 1A and illustrates an apparatus structure of the terahertz wave generating apparatus including the terahertz wave generating device. As illustrated in FIG. 1C, the terahertz wave generating device 101 is formed on a substrate 213. Here, a photoconductive film 202 is used as the optical switch portion 102. Furthermore, the terahertz wave generating apparatus includes an excitation light generating portion 209 for generating excitation light 211 and a bias applying portion 210 in addition to the terahertz wave generating device.

The substrate 213 is a part for holding the terahertz wave generating device 101. The substrate 213 is made of a material or has a structure that allows the excitation light 211 to pass therethrough. As the material, for example, there is one such as a quartz substrate or a sapphire substrate through which the excitation light 211 can pass if the excitation light 211 having a wavelength of 800 nm or 1,500 nm is used. In addition, a semiconductor substrate made of silicon carbide (SiC), gallium nitride (GaN), or the like can be used. In particular, if excitation light having a wavelength of 1,500 nm is used, a semiconductor substrate made of gallium arsenide (GaAs), silicon (Si), indium phosphide (InP), or the like can be used. A resin material such as cycloolefins, polyethylene, polycarbonate, or the like can also be used. Furthermore, a ceramic material such as aluminum nitride (AlN) can also be used. Those materials are selected appropriately according to a wavelength of the excitation light 211. As the structure, a method of forming an opening structure in a path for the excitation light 211 to pass through may be used.

In this embodiment, the second electrode portion 104 is formed so as to be thin enough for the excitation light 211 to pass through. Thus, the excitation light 211 reaches the photoconductive film 202 through the substrate 213 and the second electrode portion 104.

The excitation light generating portion 209 is a portion for generating the excitation light 211 having a predetermined wavelength. In this embodiment, the excitation light 211 generated by the excitation light generating portion 209 is a pulse beam having a pulse width within a range from several femtoseconds to several picoseconds. As the excitation light generating portion 209, a solid-state laser or a fiber laser may be used. As illustrated in FIG. 1C, the excitation light 211 generated by the excitation light generating portion 209 is condensed and irradiated to the irradiation region 107 via the substrate 213 from the second electrode portion 104 side. The irradiation region 107 is positioned in the region sandwiched between the edge of the antenna portion 105 and the second electrode portion 104 in FIG. 1C, but the position is not limited thereto as described above. The position of the irradiation region is adjusted appropriately according to radiation characteristics of the terahertz wave. In addition, the excitation light 211 is condensed to the irradiation region 107 having a size that can be regarded as a point source of wave compared with a size of the antenna portion 105. Specifically, it is desirable that the irradiation region 107 has a size of $\frac{1}{20}$ to $\frac{1}{100}$ of a wavelength for the antenna portion 105 to work as an antenna. With this structure, a radiation direction of the terahertz wave is defined mainly by the dipole direction described above, and hence the radiation direction can be easily controlled. However, the structure is not limited thereto. It is possible to adopt a structure in which the irradiation region 107 has a certain extent of size with respect to the wavelength. In this case, the dependence of the radiation direction of the terahertz wave on the incident direction of the excitation light is increased.

The bias applying portion 210 is a portion for applying the electric field to the photoconductive film 202 via the first electrode portion 103 and the second electrode portion 104. This electric field may be a DC field or an AC field. When this electric field increases, the migration of the optically pumped carrier is accelerated and the radiation intensity of the terahertz wave is increased.

With reference to FIGS. 1A, 1B and 1C, an operation of this embodiment is described based on the above description.

The excitation light generating portion 209 generates the excitation light 211 having a pulse shape. The excitation light 211 is subjected to optical adjustment in advance so that the light is condensed to the irradiation region 107 of the terahertz wave generating device. In this embodiment, the excitation light 211 is irradiated to a predetermined region of the photoconductive film 202 or its vicinity from the substrate 213 side. This predetermined region is, as illustrated in FIGS. 1A, 1B and 1C, a region of the photoconductive film 202 at one edge of the antenna portion 105, which is sandwiched between a portion including the center of the edge and the second electrode portion 104.

The bias applying portion 210 applies the electric field between the antenna portion 105 and the second electrode portion 104. The carrier generated at the irradiation region 107 of the photoconductive film 202 by irradiation with the excitation light 211 moves first along the electric field. The carrier can be regarded as being supplied from the irradiation region 107 with the excitation light 211 that is a virtual wave source. On the other hand, the antenna portion 105 formed in a part of the first electrode portion 103 serves as a resonator for the terahertz wave. Therefore, the carrier supplied from this virtual wave source is distributed along the antenna portion 105 in the direction crossing the applied electric field. This means, as described above, that the direction of the dipole accompanying the migration of the carrier is inclined with respect to the applied electric field.

Thus, the migration path of the carrier becomes an L-shaped form along the thickness direction of the photoconductive film 202 and along the antenna portion 105 as a whole. At this time, when the thickness of the photoconductive film 202 is set to be negligible with respect to the wavelength of the terahertz wave, the direction along the antenna portion 105 becomes dominant in the migration path of the carrier. For instance, the thickness of the photoconductive film 202 is set to be $1/20$ to $1/100$ of the wavelength of the terahertz wave, and hence this state can be realized.

According to such carrier distribution, as illustrated in FIGS. 1A, 1B and 1C, the electric field component direction 108 of the terahertz wave (Ethz) becomes the direction crossing the electric field applied between the antenna portion 105 and the second electrode portion 104. The terahertz wave propagates in the direction crossing the electric field component direction 108 of the terahertz wave (Ethz), and hence the radiation and propagation direction of a terahertz wave 212 becomes the direction along the direction of the applied electric field.

With the device structure and the apparatus structure of this embodiment, the propagation direction of the terahertz wave 212 can be set to be along the direction of the applied electric field. Therefore, the excitation light 211 does not need to enter in a slanting manner with respect to the direction of the applied electric field. As a result, the step of adjusting the incident angle of the excitation light 211 can be simplified.

Embodiment 2

Embodiment 2 relates to another form of the terahertz wave optical device according to the present invention. Specifically, this embodiment relates to a modification of the above-mentioned device according to Embodiment 1. Note that the descriptions of the same portions as those described above are omitted.

Figure 3A:
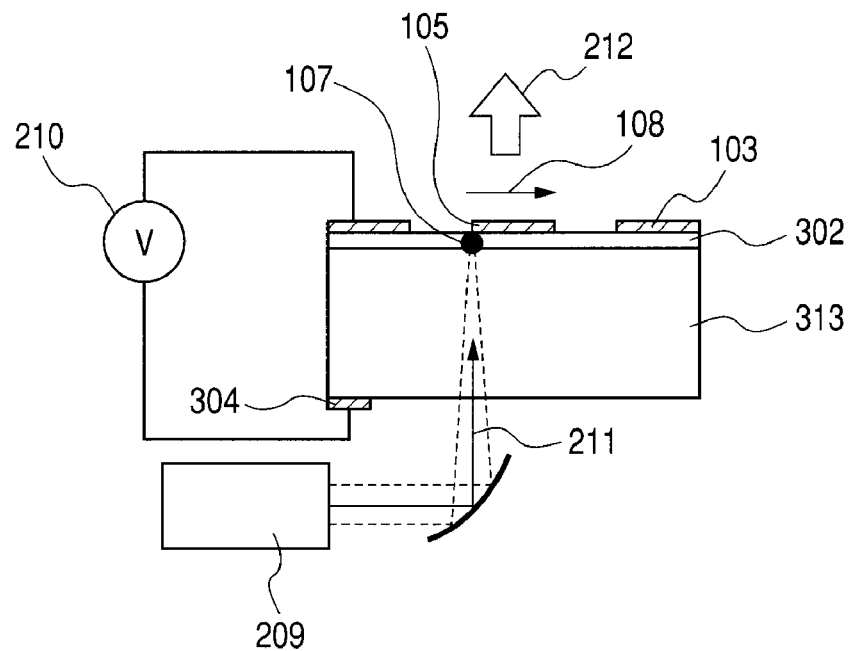
FIG. 3A is a diagram illustrating a structure of a terahertz wave generating device and a terahertz wave generating apparatus according to Embodiment 2 and Example 2 of the present invention.

FIG. 3A is a cross section of the terahertz wave optical device of this embodiment and illustrates an apparatus structure of the terahertz wave generating apparatus including the optical device. The device of Embodiment 2 is different from the device of Embodiment 1 in that a photodiode layer 302 is used as the optical switch portion 102. Another different point is in that the second electrode portion 104 illustrated in FIGS. 1A and 1B includes a second electrode portion 304 and a conductive substrate 313 as illustrated in FIG. 3A. As illustrated in FIG. 3A, the second electrode portion 304 is formed in a part of a region of the bottom surface of the conductive substrate 313.

The conductive substrate 313 is a substrate having increased carrier density in a semiconductor. The electric field applied between the first electrode portion 103 and the second electrode portion 304 is applied to the photodiode layer 302 via the conductive substrate 313. As the conductive substrate 313, existing semiconductor materials such as InP doped with Sn can be used. With this structure, only by forming a metal material to be used for the second electrode portion 304 in a part of the region of the bottom surface of the conductive substrate 313 with respect to the photodiode layer 302, it is possible to provide the same electric field applied state as that of the optical device illustrated in FIG. 1C.

Figure 3B:
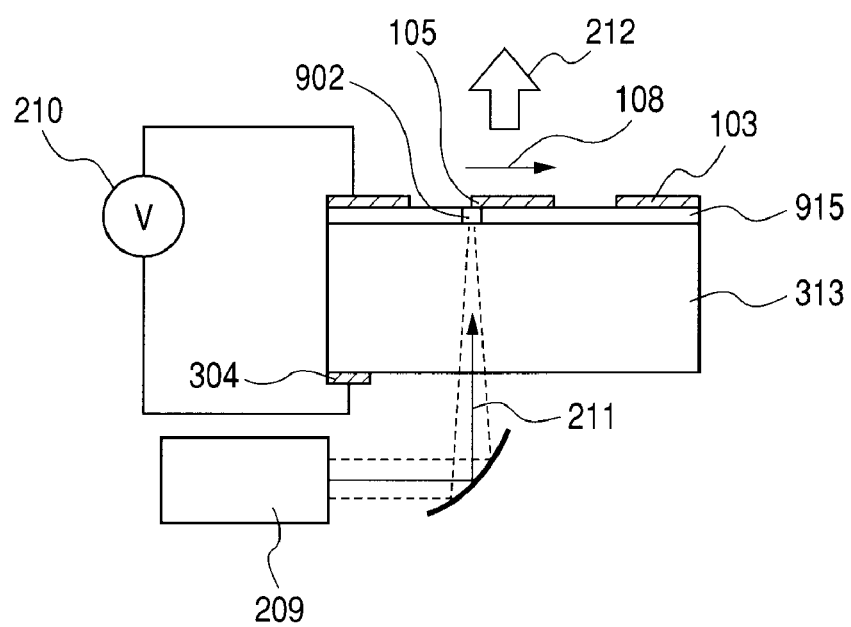
FIG. 3B is a diagram illustrating a shape of a photodiode as to the terahertz wave generating device according to Embodiment 2.

When the photodiode layer 302 is made of a semiconductor of the same type as that of the conductive substrate 313, a semiconductor growing process may be utilized to form the conductive substrate 313. The photodiode layer 302 illustrated in FIG. 3A is stacked on the conductive substrate 313, but it is possible to adopt a shape of an isolated post like a photodiode 902 illustrated in FIG. 3B. In this case, dielectric 915 is filled in order to adjust an interface between the photodiode 902 and the first electrode portion 103. It is desirable that the dielectric 915 is made of a material having a small loss for the terahertz wave. As the material, a material of a polyethylene type or a polyolefin type can be used. In this way, the form in which the portion corresponding to the optical switch portion 102 is partially disposed can be also applied to the structure of Embodiment 1 described above.

With the device structure of this embodiment, no metal layer is disposed in the semiconductor layer structure, and hence, for example, it is possible to eliminate a step of performing bonding via a metal layer. Therefore, with the structure of this embodiment, the production yield of the device can be improved. Other points are similar to Embodiment 1.

Embodiment 3

Embodiment 3 relates to still another form of the terahertz wave optical device according to the present invention. Specifically, this embodiment relates to a modification of the above-mentioned device. The descriptions of the same portions as those described above are omitted.

FIGS. 4A and 4B are diagrams illustrating a schematic structure of the device of this embodiment. Here, FIG. 4A is a top view of the terahertz wave optical device, and FIG. 4B is a bottom view of the same. This device is different from the device described above in that a lighting part 414 for restricting the irradiation region with the excitation light 211 is disposed on the second electrode portion 104 side.

The lighting part 414 is a portion that defines a transmission region and a non-transmission region of the excitation light 211 entering from the second electrode portion 104 side. This lighting part 414 is used, and hence the position of the excitation light 211 entering the optical switch portion 102 can be fixed.

The terahertz wave is extracted externally by the antenna portion 105 in the device of this embodiment as well, but the radiation characteristics of the terahertz wave in this case are determined by the device structure including the antenna portion 105. The irradiation region 107 with the excitation light 211 corresponds to a power supply point when the optical device is regarded as an antenna. For instance, if a position of the power supply point changes, the characteristics of the antenna also change. As a result, the radiation characteristics of the terahertz wave change. The lighting part 414 of this embodiment is aimed at suppression of influence of a shift of the irradiation position with the excitation light 211 due to a change in power supply point, i.e., a change in optical axis or the like.

It is desirable that the lighting part 414 has a structure in which the irradiation region 107 has a size restricted so as to be regarded as a point source of wave with respect to the antenna portion 105. For instance, in the case of FIGS. 4A and 4B, the size of the lighting part 414 is 1/20 to 1/100 of a wavelength for the antenna portion 105 to work as an antenna. With this size, influence of the structure of the lighting part 414 on the characteristics of the terahertz wave radiated from the antenna portion 105 becomes small.

The size of the lighting part 414 is determined so as not to affect the radiation characteristics of the terahertz wave. For instance, the radiation characteristics of the terahertz wave may be adjusted according to a structure or a position of the lighting part 414. In the case of the structure illustrated in FIGS. 4A and 4B, it is desirable that the size of the lighting part 414 be a size in which the wavelength of the terahertz wave is recognized as a structure, that is, a size larger than 1/20 of a wavelength for the antenna portion 105 to work as an antenna.

In this way, according to the terahertz wave optical device of this embodiment, the position of the excitation light irradiating the optical switch portion 102 through the lighting part 414 can be fixed. As a result, it is possible to obtain the effect of suppressing a change in radiation characteristics of the terahertz wave due to a change in irradiation position with the excitation light. Here, the lighting part 414 is positioned so as to overlap the irradiation region 107 with the excitation light when viewed from the thickness direction of the optical switch portion 102.

Figure 4D:
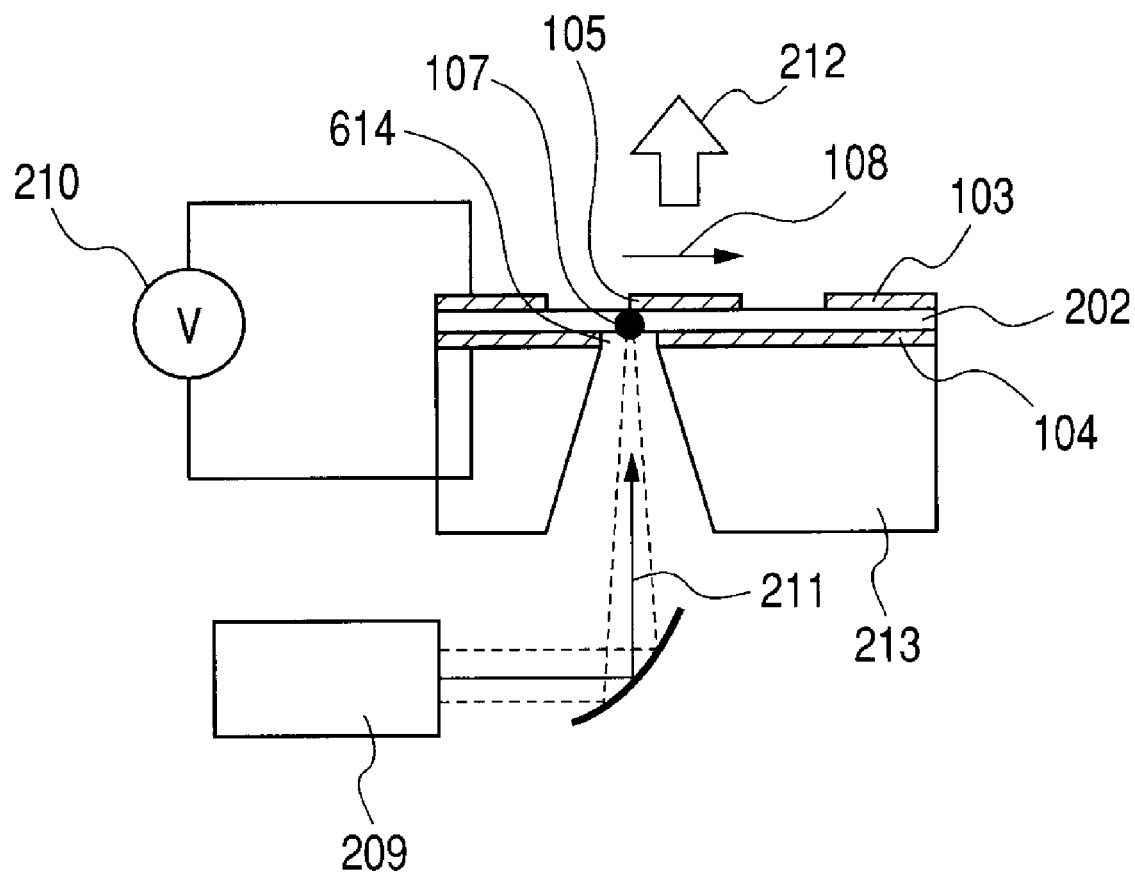
FIG. 4D is a diagram illustrating another form of a lighting part formed in a second electrode portion as to the terahertz wave generating device according to Embodiment 3.

FIGS. 4C and 4D are cross sections of the optical device taken along the alternate long and short dash line BB' of FIG. 4A and illustrate apparatus structures of the terahertz wave generating apparatus including the optical device, respectively. With the structure illustrated in FIG. 4C, the lighting part 414 is formed by patterning the second electrode portion 104. Specifically, the lighting part 414 is formed by removing the material of the second electrode portion 104 at the irradiation region 107 or its vicinity. On the other hand, as illustrated in FIG. 4D, the materials of the substrate 213 and the second electrode portion 104 may be removed along the propagation path of the excitation light 211 so as to form a lighting part 614. Furthermore, it is possible to adopt the structure in which another material is filled in the part from which a material has been removed for forming the lighting part.

In addition, if the optical device has the cross sectional structure as illustrated in FIG. 3A, the lighting part can be formed by changing the conductivity of the conductive substrate 313 in part along the propagation path of the excitation light 211. In addition, instead of changing the conductivity, the material of the conductive substrate 313 may be removed along the propagation path of the excitation light 211 so as to form the lighting part. In addition, if the irradiation region 107 of the photodiode layer 302 is restricted by a pattern of the second electrode portion 304, the lighting part can be formed. Furthermore, it is possible to adopt the structure in which another material is filled in the part from which a material has been removed for forming the lighting part.

According to the terahertz wave generating apparatus thus structured, the optical device in which adjustment of the incident angle of the excitation light is simplified is used. Therefore, it is possible to obtain the effect of simplifying the mechanism that is necessary for the angle adjustment so that the apparatus can be downsized.

Note that, in the above description, the incident excitation light 211 is condensed to the irradiation region 107. However, the irradiation region 107 is defined by the lighting part 414 or 614 in this embodiment, and hence the excitation light 211 does not need to be strictly condensed to the irradiation region 107.

As described above, with the structure of the optical device according to this embodiment, the irradiation region 107 with the excitation light 211 irradiating the optical switch portion 102 is restricted by using the lighting part 414 or 614. Therefore, even if the optical axis of the excitation light 211 changes, the influence thereof can be suppressed, and therefore the radiation characteristics of the terahertz wave can be easily stabilized. Furthermore, the radiation characteristics of the terahertz wave become insensitive to a change in optical adjustment of the excitation light 211, and hence adjustment for driving the optical device becomes easy.

Embodiment 4

Embodiment 4 relates to a further form of the terahertz wave optical device according to the present invention. Specifically, this embodiment relates to a modification of the above-mentioned terahertz wave optical device. The descriptions of the same portions as those described above are omitted.

Figure 5A:
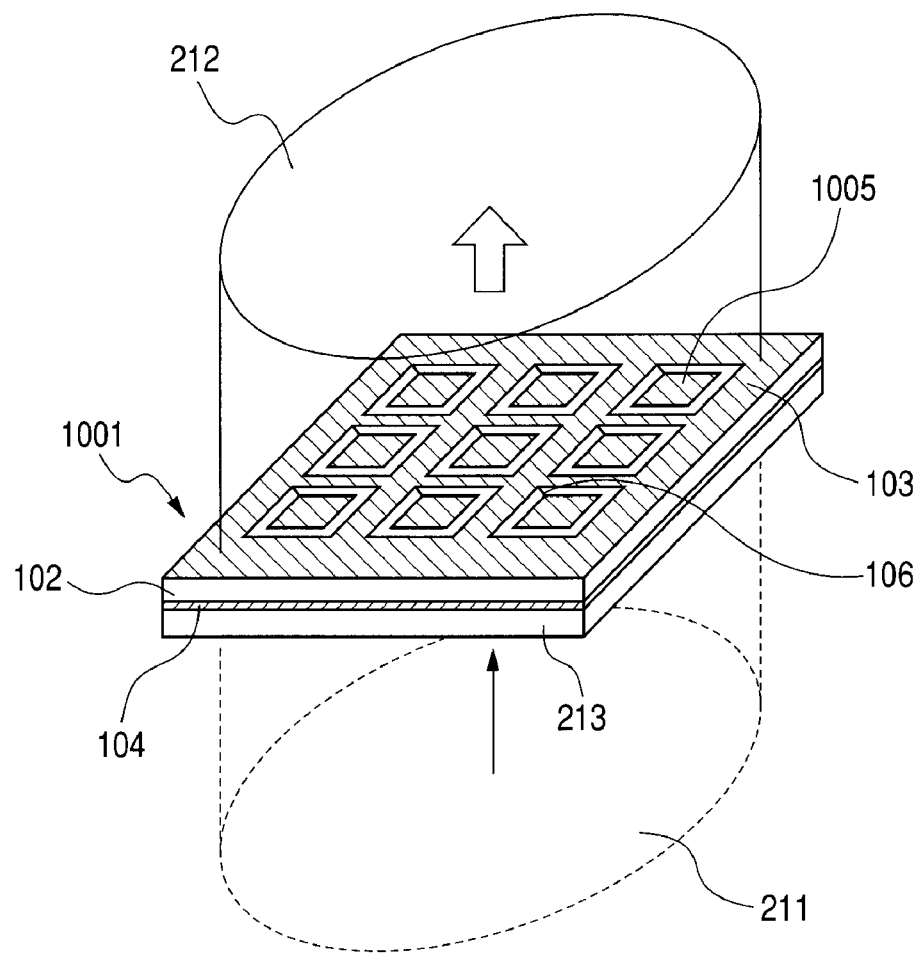
FIGS. 5A and 5B are diagrams illustrating a structure of a terahertz wave generating device according to Embodiment 4 of the present invention.
Figure 5B:
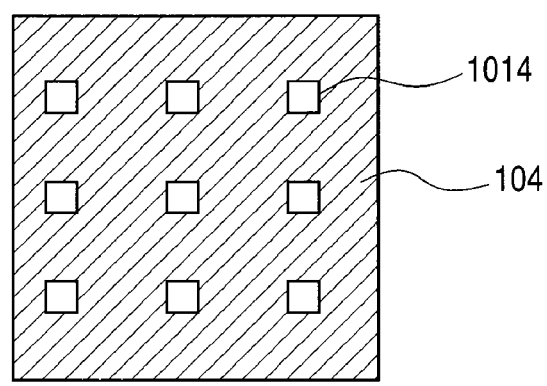

FIGS. 5A and 5B are diagrams illustrating a schematic structure of a terahertz wave generating device 1001 according to this embodiment. Here, FIG. 5A is a perspective view of the terahertz wave generating device, and FIG. 5B is a rear view of the same. The optical device of this embodiment is different from the optical device described above in that multiple antenna portions 1005 and multiple lighting parts 1014 are integrated as illustrated in FIGS. 5A and 5B.

As to the multiple antenna portions 1005, the antenna portion 105 described above is formed in plurality on the first electrode portion 103. Similarly, the multiple lighting parts 1014 are formed on the second electrode portion 104 corresponding to the individual antenna portions.

With this structure, the excitation light 211 is irradiated so as to cover the multiple lighting parts 1014, and hence the irradiation region 107 can be formed in plurality in the optical switch portion 102 corresponding to the individual lighting parts 1014. As a result, each antenna portion of the multiple antenna portions 1005 can emit the terahertz wave. In other words, the terahertz wave generating devices in number larger than the number of the excitation light 211 may be operated collectively.

With the structure of the optical device according to this embodiment, the multiple generating devices are arrayed to be operated collectively, and hence radiation electric power of the terahertz wave can be improved easily.

EXAMPLES

Hereinafter, more concrete examples are described with reference to the attached drawings.

Example 1

Example 1 relates to a structure corresponding to that of the device described above in Embodiment 1. In this example, the structure illustrated in FIGS. 1A, 1B, and 1C is employed, in which low temperature growth GaAs (LT-GaAs) is used as the photoconductive film 202 constituting the optical switch portion 102. As the substrate 213, a quartz substrate is used. Titanium (Ti)/Au is used for the first electrode portion 103 and the second electrode portion 104 that are disposed so as to sandwich the photoconductive film 202. As illustrated in FIGS. 1A and 1B, the antenna portion 105 and the fine line portion 106 are formed in a part of the first electrode portion 103.

The optical device of this example can be produced by the following production method. The thickness of an LT-GaAs layer of the photoconductive film 202 is 5 μm. The LT-GaAs layer is formed by performing molecular beam low temperature epitaxial growth (at growth temperature of 250° C.) on the gallium arsenide (SI—GaAs) substrate having semi-insulating property. Then, the second electrode portion 104 is formed on the LT-GaAs layer. This second electrode portion 104 has a thickness of 100 nm so that the second electrode portion 104 becomes translucent for the excitation light 211. The LT-GaAs layer of the photoconductive film 202 and the quartz substrate (having a thickness of 500 μm) of the substrate 213 are bonded to each other so that the second electrode portion 104 becomes the boundary therebetween. For this bonding process, a contact bonding process may be used, or junction means such as adhesive may be used. The GaAs substrate that is used for growing the LT-GaAs layer is removed by an etching process. After that, the first electrode portion 103 is patterned as illustrated in FIGS. 1A and 1B and the optical device is thus formed.

Here, the antenna portion 105 formed by patterning in the first electrode portion 103 has a square shape of 50 μm in each side. In FIGS. 1A and 1B, the antenna portion 105 is formed by removing the material of 500 μm region from the edge of the antenna portion 105 in the first electrode portion 103. The line width of the fine line portion 106 is 5 μm. The fine line portion 106 extends from one vertex of the antenna portion 105 along the diagonal line of the antenna portion 105 and is connected to the first electrode portion 103 as illustrated in FIGS. 1A and 1B.

With this structure, it is possible to provide the terahertz wave generating device 101 for generating a terahertz wave having relatively large intensity at approximately 1 THz or its vicinity.

In addition, for driving the terahertz wave generating device 101, in this example, the bias applying portion 210 applies a DC electric field of 5 V between the first electrode portion 103 and the second electrode portion 104. A titanium sapphire laser is used for the excitation light generating portion 209. This excitation light generating portion 209 generates the excitation light 211 that is an ultrashort pulse laser having a center wavelength of 800 nm, a pulse width of 50 fsec, and a repetition frequency of 76 MHz. This excitation light 211 is condensed to the irradiation region 107 with the excitation light. With this structure, the terahertz wave generating apparatus as illustrated in FIG. 1C can be provided. According to this example, it is possible to obtain actions and effects similar to those described above in Embodiment 1.

Example 2

Example 2 relates to a structure corresponding to that of the optical device described above in Embodiment 2. Descriptions of portions that are common to those described above are omitted.

In this example, a Schottky junction photodiode made mainly of indium gallium arsenide (InAlAs) is used as the photodiode layer 302 illustrated in FIG. 3A. An InP substrate doped with Sn (having a thickness of 500 μm) is used as the conductive substrate 313. Ti/Au is used for the first electrode portion 103 and the second electrode portion 304 that are disposed so as to sandwich the photodiode layer 302 and the conductive substrate 313. The same structure as that of the first electrode portion 103 of Example 1 is used for the first electrode portion 103.

The photodiode layer 302 is formed by performing molecular beam epitaxial growth for $In_{0.53}Ga_{0.47}As$ (500 nm) and $In_{0.52}Al_{0.48}As$ (100 nm) one by one on the conductive substrate 313. The first electrode portion 103 including the antenna portion 105 has the same shape as that of Example 1 and is formed on the photodiode layer 302 on the $In_{0.52}Al_{0.48}As$ layer side. In addition, the second electrode portion 304 is formed on the conductive substrate 313 side. In particular, as illustrated in FIG. 3A, the second electrode portion 304 is formed so as to avoid the propagation path of the excitation light 211.

With this structure, it is possible to provide the terahertz wave generating device 101 for generating a terahertz wave having relatively large intensity at approximately 1 THz or its vicinity. According to this example, it is possible to obtain actions and effects similar to those described above in Embodiment 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-215549, filed Aug. 25, 2008, which is hereby incorporated by reference herein in its entirety.

What is claimed is:

1. A terahertz wave generating device, comprising:
   a carrier generating portion for generating a carrier by excitation light that is externally irradiated;
   a first electrode that is provided on the carrier generating portion; and
   a second electrode disposed so as to be opposed to the first electrode with the carrier generating portion therebetween,
   wherein an antenna portion is electrically connected to the first electrode for distributing the carrier generated by the excitation light in a direction crossing an application direction of the electric field between the first electrode and the second electrode.

2. The terahertz wave generating device according to claim 1, wherein:
   the second electrode comprises a lighting part for taking the excitation light; and
   the lighting part is disposed so as to be opposed to a region that is irradiated with the excitation light via the carrier generating portion.

3. The terahertz wave generating device according to claim 1, wherein the carrier generating portion comprises one of a photoconductive film and a photodiode.

4. A terahertz wave generating apparatus, comprising:
   the terahertz wave generating device set forth in claim 1;
   an excitation light generating portion for irradiating the excitation light to the second electrode side of the terahertz wave generating device on a side of so as to couple the carrier to the antenna portion; and
   a voltage applying portion for applying a voltage to the first electrode and the second electrode such that the voltage is applied in a direction substantially perpendicular to the in-plane direction of the carrier generating portion.

5. The terahertz wave generating apparatus according to claim 4, wherein the antenna portion is adapted to receive the excitation light irradiated by the excitation light generating portion at an edge of the antenna portion.

6. The terahertz wave generating device according to claim 1, wherein the antenna portion has a size that substantially corresponds to the wavelength of the terahertz wave, and wherein the thickness of the carrier generating portion is $\frac{1}{20}$ to $\frac{1}{100}$ of the wavelength of the terahertz wave.

7. The terahertz wave generating device according to claim 1, wherein the carrier generating portion comprises an irradiation region irradiated with the excitation light, and wherein the irradiation region has a size of $\frac{1}{20}$ to $\frac{1}{100}$ of the wavelength of the terahertz wave.

8. The terahertz wave generating device according to claim 1, wherein the antenna portion has a shape that is isolated from the first electrode.

9. The terahertz wave generating device according to claim 1, wherein the antenna portion is provided on the carrier generating portion.

10. The terahertz wave generating device according to claim 9, wherein the antenna portion is a part of the first electrode.

* * * * *